Aug. 14, 1951  R. C. BUTMAN  2,563,816

FREQUENCY DISCRIMINATOR

Filed July 7, 1948

INVENTOR
ROBERT CHARLES BUTMAN

BY  *M. C. Hayes*

ATTORNEY

Patented Aug. 14, 1951

2,563,816

UNITED STATES PATENT OFFICE 2,563,816

FREQUENCY DISCRIMINATOR

Robert C. Butman, West Medford, Mass.

Application July 7, 1948, Serial No. 37,335

9 Claims. (Cl. 250—27)

(Granted under the act of March 3, 1883, as amended April 30, 1928; 370 O. G. 757)

This invention relates in general to the art of frequency measurement and more particularly to frequency discrimination.

In the electronic art, frequency measurements and frequency control are usually necessary to the proper operation of any transmitting or receiving system. Most of the equipment in use for automatic frequency control depends upon a signal obtained from a continuous monitoring of the output signal of the system. The signal obtained is usually translated into an error voltage of a value that is proportional to the difference between the actual output frequency and the desired output frequency. This error voltage is then applied to a control stage of the system to reset the output of the system to the desired frequency.

Heretofore, frequency discriminators and the automatic frequency control systems that were operated from such sources were objectionable for several reasons. Usually, they employed tuned elements to provide a standard frequency as a basis of comparison. The use of tuned elements required close control of the operating voltages, maintenance of ambient temperature to a fine degree, and often, the initial cost was high. Another factor in the use of conventional frequency control systems was the frequency range limitations. The operation of the control system was necessarily held to a narrow band of frequencies.

To avoid the foregoing difficulties, the present invention contemplates a circuit that is structurally simple and requires no tuned elements or other sensitive components for operation as a frequency discriminator. Further, the system incorporating the frequency discriminator is operable over a substantially unlimited frequency range.

Accordingly, it is the general object of this invention to provide a simple circuit for frequency discrimination.

It is another object of the present invention to provide a frequency discrimination circuit that is operative with signal energy of various wave shapes.

It is a further object of the present invention to provide a simple frequency discrimination circuit for use in frequency control systems operating over broad ranges of frequency.

These and other objects will be apparent from the following specification when taken with the accompanying drawing in which.

Figure 1:
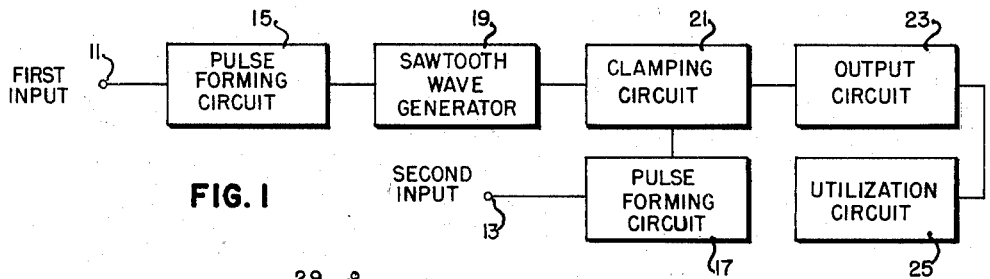
Fig. 1 is a general block diagram broadly indicating one form of the invention.

The operation of the circuit illustrated in Fig. 1 may be described in general terms as follows. Signal energy of two distinct frequencies is applied at the two input terminals 11 and 13 and transformed into voltage pulses by conventional pulse-forming circuits 15 and 17. The pulses from pulse-forming circuit 15 actuate a saw-tooth wave generator 19 which, in turn, provides a saw-tooth wave to the clamping circuit 21. Clamping circuit 21 is responsive to the output of pulse-forming circuit 17, and only when a voltage pulse is received from circuit 17, is the instantaneous value of the saw-tooth wave impressed upon the output circuit 23. The signal from the output circuit 23 is fed into a utilization circuit 25, which term may denote any of several conventional circuits such as a control circuit for maintaining the output of a fixed-frequency system or a circuit for utilizing the difference frequency obtained from the output circuit 23.

Figure 2:
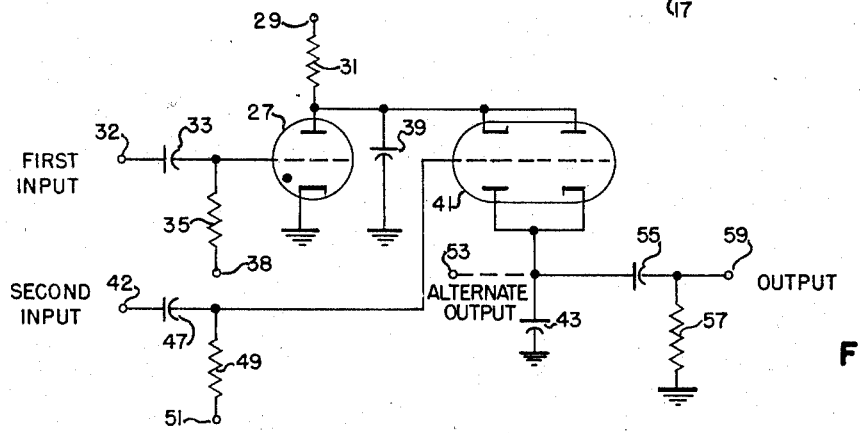
Fig. 2 is a schematic illustration of the circuit diagram of the major components of the invention.

Referring to Fig. 2, the schematic diagram illustrates in detail the circuit represented by the saw-tooth generator 19, the clamping circuit 21, and the output circuit 23 of Fig. 1. Tube 27, in this embodiment, is a gas triode, connected in the conventional manner with cathode grounded, and plate connected to terminal 29 of a suitable direct-current supply through resistor 31. The grid is provided with a series input capacitor 33 and biasing resistor 35 connected to terminal 38 of a suitable bias supply. Terminal 38 may be merely a ground connection in some instances.

A saw-tooth wave is generated in this circuit by the action of pulses of voltage applied at terminal 32 (from the pulse forming circuit 15 of Fig. 1) which are in turn applied to the grid of the gas triode 27. The pulses (Fig. 3A) applied to the grid of gas tube 27 drive the tube into conduction, allowing capacitor 39 to discharge rapidly through the tube 27. When the decreasing voltage of the discharging capacitor falls below the value needed to maintain ionization, tube 27 cuts off and condenser 39 slowly charges from terminal 29 of the direct-current plate supply through resistor 31. Thus, as pulses are applied, a train of saw-tooth waves of a frequency equal to the repetition rate of the applied pulses is generated, the wave form thereof being illustrated in Fig. 3B. Other types of saw-tooth wave generators may, of course, be used to accomplish this same result.

Tube 41 is preferably a double triode, high vacuum tube which is used as a clamping tube. Generally, the term "clamping circuit" is defined as a circuit in which either amplitude extreme of a wave form is maintained at a certain potential level. In Fig. 2, tube 41 and associated capacitor 43 constitute a clamping circuit. When no signal is applied to the connected grids of twin triode 41, the triode sections are each cut off and the potential across capacitor 43 remains substantially fixed. The clamping circuit is responsive to positive pulses of voltage (Fig. 3C), applied at terminal 42 to the grids of tube 41 through the grid input circuit composed of series capacitor 47 and biasing resistor 49 which is connected to the terminal 51 of a suitable bias supply. This terminal may, in fact, be at ground potential if desired. Terminal 42 corresponds to the output of pulse forming circuit 17 of Fig. 1.

When the triode grids are actuated by one of the positive pulses shown in Fig. 3C, the appropriate triode section is rendered conductive, depending upon whether the voltage across capacitor 43 is greater or less than the voltage across capacitor 39. Thus, conduction of either triode section will substantially equalize the voltages of capacitors 39 and 43. When the positive pulse initiating the equalizing action of these capacitor voltages terminates, the voltage across capacitor 43 remains fixed until the next pulse is applied to the triode grids. It may be seen, therefore, that the voltage across capacitor 43 will, in periods between pulses, be fixed at the instantaneous value of the saw-tooth wave voltage appearing across capacitor 39 at the time of termination of the last preceding activating pulse applied at terminal 42.

Figure 3:
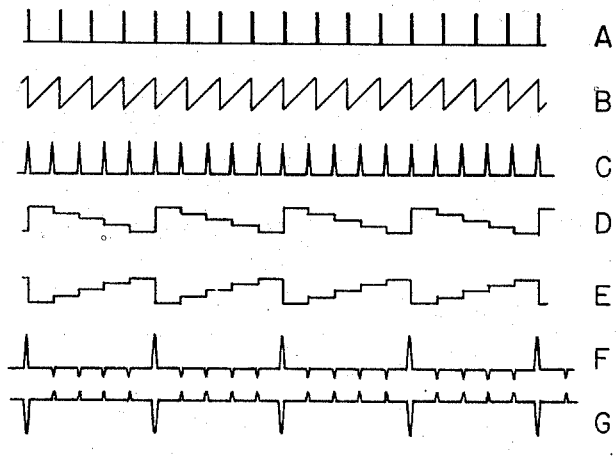
Fig. 3 is an illustration of wave shapes obtained as hereinafter described.

The output of the clamping circuit may be taken at terminal 53 if desired, and the wave form of the output voltage at this point is either shown in Fig. 3D or Fig. 3E. If the repetition rate of voltage pulses applied at terminal 32 is less than the repetition rate of the pulses applied at terminal 42, the output at terminal 45 is as shown in Fig. 3D. If the repetition rate of the voltage pulses applied at terminal 32 exceeds the repetition rate of the pulses applied at terminal 42, the output at terminal 45 is as shown in Fig. 3E. It may be seen from the diagrams of Fig. 3 as a whole that the frequency of the output at terminal 45 is the difference frequency of the frequencies (or repetition rates) applied at terminals 32 and 42. Also, as exemplified in Fig. 3D and Fig. 3E, the polarity of the saw-tooth wave is dependent upon the relative values of frequency of the input signals. Accordingly, if one signal frequency is known, then polarity of output indicates whether the other signal frequency is higher or lower than the known frequency.

In the event that a pulsed voltage output is desired for other applications in a utilization circuit, a differentiation circuit composed of capacitor 55 and resistor 57 may be used. The output voltage at terminal 59 then would be of the form illustrated in Fig. 3F when the frequency of the signal at terminal 32 is less than that applied at terminal 42. Fig. 3G illustrates the form of the voltage that would be obtained at terminal 59 when the frequency of the signal applied at terminal 32 exceeds that applied at terminal 42.

In summary, the circuit illustrated provides output signals readily adapted for frequency control and frequency measurement. The wave forms shown in Figs. 3D, 3E, 3F and 3G are suitable for use as error signals in stabilizing the source of one of the two input sources relative to the other. By counting the pulse output wave forms Fig. 3F and Fig. 3G, an indication of relative frequency deviation is obtained. Other applications of the circuit shown will, of course, become evident to those skilled in the art.

Thus, while what have been described in the foregoing specification are at present considered the preferred embodiments of the invention, the invention need not be limited to the details shown, but only within the scope of the appended claims.

The invention described herein may be manufactured and used by or for the Government of the United States of America for government purposes without the payment of royalty thereon or therefor.

What is claimed is:

1. A circuit for detecting the difference between the frequencies of two signals comprising, a pulse-forming circuit, saw-tooth wave generating means, two triode clamping tubes, the plate of the second of said clamping tubes connected to the cathode of the first of said clamping tubes and to the output of said saw-tooth wave generating means, the plate of the first of said clamping tubes connected to the cathode of the second of said clamping tubes, the grids of both clamping tubes being connected together, means connected to the input of said pulse-forming circuit for applying the first of said two signals, means connected to the grids of said clamping tubes for applying the second of said two signals, and an output circuit connected to the cathode of the second of said clamping tubes whereby, upon application of the said two signals, said output circuit provides a signal of characteristic polarity and frequency determined by the relative frequencies of the aforesaid two signals.

2. An electronic circuit for detecting the difference between, and the larger of the repetition rates of two pulse trains comprising, a gas triode saw-tooth voltage generator having at least a cathode, a plate, and a grid, two triode clamping tubes, the plate of the second of said clamping tubes being connected to the cathode of the first of said clamping tubes and to the plate of said gas triode, the plate of the first of said clamping tubes being connected to the cathode of the second of said clamping tubes, the grids of both clamping tubes being connected together, means connected to the grid of said gas triode for applying the first of said pulse trains, said gas triode providing at the plate thereof a saw-tooth voltage at the frequency of said first pulse train, means connected to the grids of said clamping tubes for applying the second of said pulse trains, and an output circuit connected to the cathode of the second of said clamping tubes whereby, upon application of the said pulse trains, said output circuit provides a signal of characteristic polarity and frequency determined by the relative repetition rates of the aforesaid pulse trains.

3. Apparatus as in claim 2 wherein said output circuit comprises a capacitor, the voltage across said capacitor being fixed in the period between pulses in the second of said pulse trains, the value of said voltage being substantially equal to the instantaneous value of said saw-tooth voltage at the termination of the last preceding pulse of said second pulse train.

4. An electronic circuit for detecting the difference between, and the larger of, the repetition rates of two pulse trains comprising, a generator for providing saw-tooth waves at a repetition rate equal to that of the first of said pulse trains in response to application of said pulse train thereto, a double clamping triode having the anode and the cathode of the first section thereof connected to the cathode and the anode respectively of the second section thereof, and both grids connected together, the output of said generator being applied to a first of said cathode and anode combinations, the second of said pulse trains being applied to said grids, the output of said clamping tubes being taken from the second of said anode and cathode combinations, a storage capacitor connected to the second of said anode and cathode combinations and having the output of said clamping tubes applied thereto, whereby a signal of characteristic polarity and frequency determined by the relative repetition rates of said pulse trains is provided.

5. An electronic circuit for providing pulses of a frequency and polarity determined by the frequency and polarity of two applied pulse trains comprising, a generator of saw-tooth voltage waves, a double clamping triode having two triode sections, the anode of the first section being connected to the cathode of the second section, the anode of the second section being connected to the cathode of the second section, the grids of both sections being connected together, the first of said two pulse trains being applied to said connected grids, the second of said pulse trains being applied to said saw-tooth generator for providing a saw-tooth voltage output of a frequency equal to that of said second pulse train, said saw-tooth voltage output being applied to the first of said anode-cathode combinations, and an output circuit connected to the second of said anode-cathode combinations said output circuit including a storage capacitor and a differentiating circuit for providing pulses of characteristic polarity and frequency determined by the relative frequencies of said pulse trains.

6. A discriminating circuit comprising, a first pulse forming circuit, a sawtooth wave generator connected to said pulse forming circuit and providing sawtooth waves of a frequency equal to the repetition rate of pulses from said first pulse forming circuit, a second pulse forming circuit, a clamping circuit including a double triode tube having the cathode of the first section thereof connected to the anode of the second section thereof and the anode of the first section thereof connected to the cathode of the second section thereof, means connecting the output of said sawtooth wave generator to a first of said cathode-anode combinations, said sawtooth wave generator including a first capacitor connected between the first of said cathode-anode combinations and a reference point, means connecting the output of said second pulse forming circuit to the grids of both said sections of said double triode, a second capacitor connecting the second of said cathode-anode combinations to said reference point, said triode sections being conductive only upon application thereto of pulses from said second pulse forming circuit, the instantaneous voltage on said first capacitor being impressed upon said second capacitor only upon application of pulses from said second pulse forming circuit to said grids.

7. Apparatus as in claim 6 including a differentiating circuit comprising, a coupling capacitor and resistor in series with said second capacitor, said resistor also being connected to said reference point, the output of said differentiating circuit being taken between the junction of said coupling capacitor and said resistor and said reference point.

8. An electronic circuit comprising, first and second voltage sources, a first pulse forming circuit connected to said first voltage source for forming pulses of repetition rate equal to the frequency of the output of said first voltage source, a second pulse forming circuit connected to said second voltage source for forming pulses of repetition rate equal to the frequency of said second voltage source, a sawtooth wave generator, means for applying pulses from said first pulse forming circuit to said sawtooth wave generator, said sawtooth wave generator providing sawtooth waves of a frequency equal to the repetition rate of pulses from said first pulse forming circuit, a clamping circuit including a vacuum tube having double triode sections, the cathode of said first section being connected to the anode of said second section, the anode of said first section being connected to the cathode of said second section, a first capacitor connecting the first of said cathode-anode combinations to a reference point, means connecting the output of said sawtooth wave generator to said first cathode-anode combination, means for applying pulses from said first pulse forming circuit to both grids of said double triode tube, a second capacitor connecting the second of said cathode-anode combinations to said reference point, the instantaneous value of voltage on said first capacitor being impressed upon said second capacitor only upon conduction of one of said triode sections in response to pulses applied to the grid thereof from said second pulse forming circuit, the voltage on said second capacitor constituting a stepped sawtooth wave of characteristic polarity and frequency determined by the relative repetition rates of said pulses from said first and second pulse forming circuits.

9. Apparatus as in claim 8 including a differentiating circuit comprising, a coupling capacitor and resistor in series with said second capacitor, said resistor also being connected to said reference point, output pulses of characteristic polarity and frequency being developed across said resistor, the polarity and frequency of said output pulses being determined by the relative frequencies of said pulses from said first and said second pulse forming circuits.

ROBERT C. BUTMAN.

REFERENCES CITED

The following references are of record in the file of this patent:

UNITED STATES PATENTS

| Number | Name | Date |
|---|---|---|
| 2,335,265 | Dodington | Nov. 30, 1943 |
| 2,436,890 | Higinbotham | Mar. 2, 1948 |
| 2,462,109 | Levy | Feb. 22, 1949 |